(12) United States Patent
Works

(10) Patent No.: US 8,408,577 B2
(45) Date of Patent: Apr. 2, 2013

(54) HEIGHT ADJUSTABLE STOW-AWAY RECEIVER HITCH

(75) Inventor: Joseph W. Works, Humboldt, KS (US)

(73) Assignee: B & W Truck Beds, Inc., Humboldt, KS (US)

( * ) Notice: Subject to any disclaimer, the term of this patent is extended or adjusted under 35 U.S.C. 154(b) by 23 days.

(21) Appl. No.: 13/037,021

(22) Filed: Feb. 28, 2011

(65) Prior Publication Data

US 2012/0217724 A1  Aug. 30, 2012

(51) Int. Cl.
*B60D 1/07* (2006.01)
(52) U.S. Cl. .................................. 280/491.1; 280/490.1
(58) Field of Classification Search ............... 280/491.1, 280/490.1
See application file for complete search history.

(56) References Cited

U.S. PATENT DOCUMENTS

| | | | |
|---|---|---|---|
| 4,662,647 A | 5/1987 | Calvert | |
| 5,975,553 A | 11/1999 | Van Vleet | |
| 6,460,870 B2 | 10/2002 | Moss | |
| 6,497,428 B2 | 12/2002 | Ross | |
| 6,712,381 B1 * | 3/2004 | Moss | 280/491.1 |
| 6,789,815 B2 | 9/2004 | Moss et al. | |
| 6,824,156 B2 * | 11/2004 | Smith | 280/490.1 |
| 6,902,181 B1 | 6/2005 | Dye | |
| 6,908,099 B2 * | 6/2005 | Andersen | 280/511 |
| 6,974,148 B2 * | 12/2005 | Moss et al. | 280/511 |
| 7,004,492 B2 | 2/2006 | Moss et al. | |
| 7,021,643 B1 | 4/2006 | Buchanan | |
| 7,029,022 B2 * | 4/2006 | Moss | 280/491.3 |
| 7,125,036 B2 * | 10/2006 | Moss et al. | 280/511 |
| 7,156,412 B2 | 1/2007 | Andersen | |
| 7,204,505 B2 | 4/2007 | Moss | |
| 7,222,510 B2 | 5/2007 | Andersen | |
| 7,451,996 B2 | 11/2008 | Miles et al. | |
| 2008/0258433 A1 | 10/2008 | Moss | |
| 2010/0127479 A1 * | 5/2010 | Weipert et al. | 280/491.1 |

* cited by examiner

*Primary Examiner* — Kevin Hurley
*Assistant Examiner* — Michael Stabley
(74) *Attorney, Agent, or Firm* — Erickson Kernell Derusseau & Kleypas, LLC

(57) ABSTRACT

An adjustable hitch assembly including a mounting collar, a hitch base with a vertical post having a plurality of alternating square sections and circular sections, a hitch ball member having at least one hitch ball and a pivot shaft extending therefrom. The vertical post is slidably and rotatably received through the mounting collar; the pivot shaft is rotatably received in the mounting collar. The mounting collar, to which the hitch ball member is attached, may slide vertically along the vertical post and may rotate about the vertical post to adjust the height and angular position of the hitch ball member. The hitch ball member may have a plurality of variously sized hitch balls that a user may select by rotating the hitch ball member about the pivot shaft. A single rotatable latch pin received by the mounting collar engages and disengages the various components of the hitch assembly to allow adjustability.

31 Claims, 8 Drawing Sheets

HEIGHT ADJUSTABLE STOW-AWAY RECEIVER HITCH

BACKGROUND OF THE INVENTION

1. Field of the Invention

This invention relates to an adjustable hitch for attachment to motor vehicles, and in particular to a height adjustable hitch with dual, rotatably selectable hitch balls for the purpose of towing a hitched load such as a trailer.

2. Background & Description of the Related Art

Hitches are devices that connect a tow vehicle to a trailer vehicle by means of a hitch ball mounted on the tow vehicle or tow bar. The hitch ball of the tow vehicle couples to a ball socket located on the trailer vehicle or trailer tongue. This ball and socket configuration has long been known to allow adequate rotation of the socket with respect to the ball so that the coupled tow and trailer vehicles can maneuver turns and pass over vertical road variations without shearing or otherwise damaging the coupling mechanism. Typically, the socket mechanism has a latchable and preferably lockable coupling so that it locks onto the hitch ball to prevent decoupling while towing.

A problem with conventional hitches occurs when the hitch ball is higher or lower than the ball socket. For example, the ball socket of the trailer hitch may rest below the horizontal plane of the hitch ball on the towing vehicle so that the trailer vehicle must first be jacked up or elevated to allow the hitch ball to be positioned under the ball socket. The prior art teaches an integrated jack, among other methods, to accomplish the elevation of the trailer vehicle and attached hitch ball. Incorrect hitch ball height may cause uneven load distribution of the trailer and unsafe towing operation or excessive or uneven wear on the tires. Some hitches have no means of adjusting the vertical position of the hitch ball. Other hitches with vertical adjustment mechanisms are time consuming to adjust because they require replacing parts of the hitch to obtain a suitable height.

With the purpose of overcoming these problems, several types of hitches have been developed to adjust the hitch ball height on the towing vehicle to correspond more appropriately with the ball socket height on the trailer vehicle. Generally, the prior art discloses a height adjustable hitch ball having a vertical bar slidably received by a sleeve. The height of the hitch ball is adjusted by sliding the vertical bar vertically through the sleeve and selectively fixing a desired vertical position of the hitch ball by inserting a pin through the vertical bar and sleeve.

Alternatively, the vertical bar and hitch ball may be fixed in a desired position by fastening the components together with threaded fasteners. For example, U.S. Pat. No. 7,451,996 to Miles et al. teaches a hitch assembly comprising a vertically adjustable bar secured within a mounting sleeve which in turn is securely attached to a hitch bar. A hitch ball is attached to the vertical bar. A vertical securing pin attached to the mounting sleeve releasably engages the vertical bar and is maintained in place by a spring, the pin and spring comprising the vertical securing mechanism. The vertical bar has a series of holes in which the vertical securing pin may be selectively engaged depending on the desired vertical position of the hitch ball. This apparatus allows the hitch ball position relative to a towing ball socket to be vertically adjusted without requiring removal of any parts. Similarly, U.S. Pat. No. 6,824,156 to Smith teaches an adjustable hitch assembly which mates with standard hitch receivers and hitch balls such that the relative height of the hitch ball may be varied during use. The hitch assembly includes an elongated housing, a threaded shaft in the housing, a coupling member on the shaft, a carriage member secured to the coupling member, a rotatable drive that turns the shaft to advance the coupling member and carriage member, a first member secured to the housing for connection to one of the vehicles and a second member secured to the carriage for connection to the other vehicle. This allows the effective height of the hitch assembly to be varied so that different towing situations can be accommodated.

The prior art has also been developed to provide a plurality of hitch balls on a single hitch assembly. These hitch assemblies generally allow for a user to selectively rotate an assembly for use of a desired hitch ball. The selection of a desired hitch ball typically depends on a required hitch ball size for a particular ball socket. For example, U.S. Pat. No. 7,021,643 to Buchanan teaches a carousel trailer hitch providing an adaptive hitch for a box trailer hitch mounted underneath a vehicle bumper attached to a vehicle frame. The carousel hitch includes a box hitch attaching end to which is attached an angled spindle having a rotating carousel base member having a plurality of angled support arms, upon which is provided a plurality of varied ball hitches and implement hitch which may be rotated without being impeded by the bumper of the vehicle by the carousel base member being presented at an angle. The angle of the support arms allows the carousel to be selectively rotated for desired use of one of the plurality of hitch balls. The selected rotation is locked into place by inserting a lock pin into the stem of the rotatable carousel. U.S. Pat. No. 7,004,492 to Moss et al. also discloses a hitch assembly for presenting different sized hitch balls. The hitch includes a first ball and pedestal extending in a first direction and a second ball and pedestal extending in a second direction forming a monolith. A stem extends from the monolith in a third direction. The monolith is selectively rotated about the longitudinal axis of the stem to a desired hitch ball position.

The prior art has also been developed to provide for stowing of the hitch ball without the need to remove components of the hitch assembly from the towing vehicle. For example, U.S. Pat. No. 6,460,870 to Moss teaches a trunnion, adapted to fit in a receiver, attached to a vehicle as a receiver-type hitch system to provide for selective deployment and stowage of a hitch. In certain embodiments, the trunnion connects to a pivot which connects a base to a hitch. A base supports a mount, which may be moved between a stowed and a deployed position. The base includes parallel deployment and pivot apertures in which a lock or locking pin is received therethrough to secure the mount in the deployed or stowed positions, respectively.

It is common for a hitch user to desire multiple adjustments to a hitch assembly during the course of use. For example, as illustrated by the improvements in the prior art discussed above, a user may desire to adjust the height of the hitch ball, adjust the size of the hitch ball, and stow the hitch assembly when not in use. The prior art requires each of these adjustments to be done separately and with separate mechanisms fixing each adjustment in the desired position. Commonly, the mechanisms are fixed in a desired position by inserting a removable locking pin to engage the components in the desired position. However, removable locking pins may be lost, dropped, stolen or become seized in place. For adjustments requiring tightening and loosening of threaded fasteners, tools required for tightening or loosening of threaded fasteners may not be readily available when the adjustment is desired. An improvement over the prior art is needed that allows a user to easily make multiple adjustments, namely, hitch ball height, hitch ball size and stow/use position to a hitch assembly without the need for multiple locking mechanisms and tools.

SUMMARY OF THE INVENTION

The present invention is directed to a height adjustable, stow-away hitch assembly with multiple, selectable ball sizes. The hitch includes a hitch base with a horizontal shaft and a vertical post, a hitch ball mounting collar vertically slidable and rotatably mounted on the vertical post and a hitch ball assembly with at least two opposed hitch ball heads rotatably mounted on the mounting collar to permit selective use of the at least two hitch ball heads. The hitch assembly allows adjustability of the ball height, selection of a tow or stow position and selection of hitch ball size without requiring the removal of any parts of the hitch assembly. Instead these adjustments and selections are made by selectively rotating a single rotatable latch pin to selectively engage or disengage the various components. The pin is rotated in and out of engagement with pin receiving grooves on the vertical post and on a shaft of the hitch ball assembly to fix the assembly in a desired position or allow the user to move the hitch ball assembly into the desired position.

The horizontal shaft of the hitch base is sized for reception in a hitch receiver on a tow vehicle. The vertical post is formed from a square bar with beveled vertical edges and extends vertically when the hitch base shaft is secured in a hitch receiver. The vertical post has a front edge, a rear edge and two side edges. Circular grooves or channels are machined into or formed in the post to create evenly spaced and alternating circular segments and square segments along the length of the post. The post includes at least two circular segments and three square segments which allows the hitch ball member to be positioned at one of two selected heights. A pin receiving groove is formed in each circular segment adjacent to and in line with at least two opposing corners of the vertical post or in one embodiment in each of the four corners. The pin receiving grooves are selectively engaged with the latch pin to fix a desired orientation of the hitch ball member as further described below.

The hitch ball assembly includes a central body or base with at least one hitch ball extending from a hitch ball base along a hitch ball axis and a hitch ball member shaft projecting from the hitch ball base transverse to the hitch ball axis. The hitch ball member shaft is rotatably secured to the mounting collar such that the at least one hitch ball is rotatable into and out of an upwardly extending alignment relative to the hitch base. In a preferred embodiment, the hitch ball assembly includes first hitch ball and a second hitch ball formed on opposing ends along the hitch ball axis. Pin receiving grooves formed on the end of the hitch ball pivot shaft are selectively engaged by the rotating latch pin to fix the hitch ball assembly in a desired orientation as further described below.

The hitch ball mounting collar assembly includes a post receiving collar having a vertical post receiving bore extending therethrough. A shaft receiving collar, with a horizontal hitch ball member shaft receiving bore is formed on the post receiving collar. A latch pin receiving bore is formed in a latch pin sleeve connected at the juncture between the post receiving collar and the hitch ball member shaft receiving collar. Upper and lower sections or portions of the vertical post receiving bore are generally square in shape just slightly greater in width than the square cross-section segments of vertical post. The middle portion or section of the vertical post receiving bore is circular having a diameter that exceeds the diagonal dimension (or widest dimension) of each square portion of the vertical post receiving bore. The mounting collar assembly is slidable on the vertical post when the square bore sections are axially oriented in vertical alignment with the square cross-section segments of the vertical post. The mounting collar assembly is rotatable about the vertical post when the square bore sections are horizontally aligned with circular cross-section segments of the vertical post.

The pivot shaft receiving collar extends outward from the post receiving collar and transverse to the axis of the vertical post receiving bore and the latch pin receiving bore; the pivot shaft receiving bore extends therethrough. The latch pin receiving bore extends horizontally through the latch pin receiving sleeve and generally tangential to but overlapping and opening into the circular middle portion of the vertical post receiving bore and intersecting and opening into the pivot shaft receiving bore.

The pivot shaft extending from the hitch ball member is received within the horizontal pivot shaft receiving bore in shaft receiving collar. The pivot shaft is rotatable about its longitudinal axis within the shaft receiving collar such that a user may rotate the pivot shaft to a desired orientation of the hitch balls. The vertical post is slidably received through the vertical post receiving bore of the post receiving collar.

The latch pin is generally cylindrical with a notch formed on one side of the cylinder. When the notch is rotated to face upwards, the latch pin may be described as being in a latched position with the cylindrical walls of the latch pin received by the respective pin receiving grooves of the vertical post and pivot shaft thus fixing the respective components in the desired position. When the latch pin is rotated so that the notch faces the vertical post, the latch pin may be described as being in a mounting collar adjustment position. In the mounting collar adjustment position, the notch is sized to permit the latch pin to slide past any of the square segments of the vertical post to permit vertical sliding and axial rotation of the mounting collar assembly relative to the hitch base vertical post. In the mounting collar adjustment position, no portion of the latch pin prevents vertical sliding or axial rotation of the mounting collar assembly relative to the hitch base vertical post. When the latch pin is rotated so that the notch faces the hitch ball pivot shaft, the latch pin may be described as being in a hitch ball member adjustment position. In the hitch ball member adjustment position, the latch pin does not prevent rotation of the hitch ball member shaft relative to said mounting collar and the hitch ball member rotates freely in the shaft receiving collar.

A user may select from various hitch balls and adjust the height and angle of the hitch ball. For example, a user may select a desired hitch ball and adjust the vertical height of the hitch ball to correspond to the height of a ball socket on a trailer vehicle. Alternatively, if the user desires to stow the hitch ball, the hitch member may be rotated to a stowed position beneath the hitch receiver. The single rotating latch pin selectively fixes the components in a desired position or allows the user to make the desired adjustments without the need for removable pins or tools. A lock is provided to permit locking of the latch pin in a fully latched position.

DETAILED DESCRIPTION OF THE PREFERRED EMBODIMENTS

Figure 1:
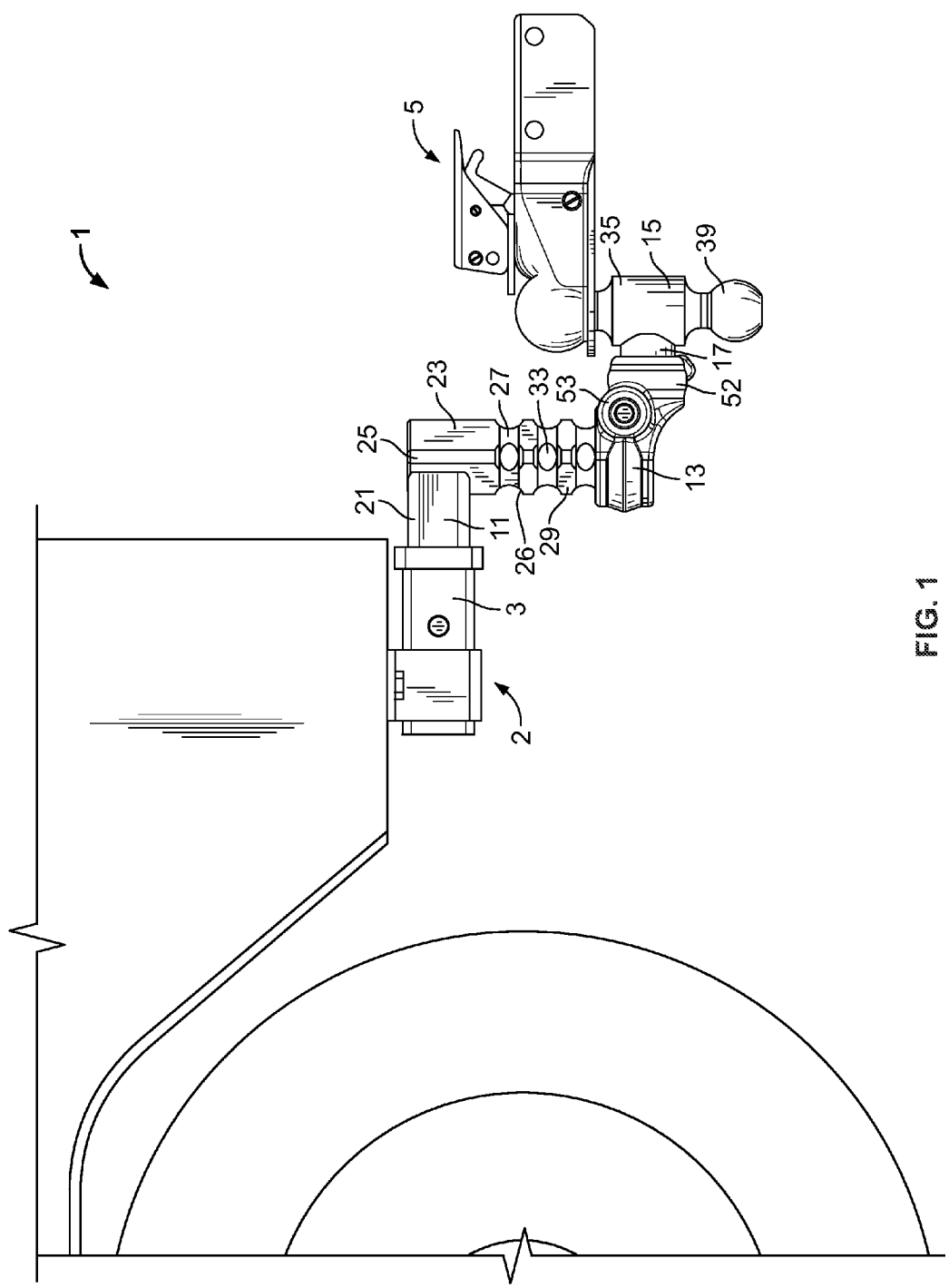
FIG. 1 is a fragmentary, side view of a hitch assembly secured in a receiver hitch of a tow vehicle with a trailer coupled thereto.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

It is to be understood that while certain forms of the present invention have been illustrated and described herein, it is not to be limited to the specific forms or arrangement of parts described and shown.

As used in the claims, identification of an element with an indefinite article "a" or "an" or the phrase "at least one" is intended to cover any device assembly including one or more of the elements at issue. Similarly, references to first and second elements is not intended to limit the claims to such assemblies including only two of the elements, but rather is intended to cover two or more of the elements at issue. Only where limiting language such as "a single" or "only one" is used with reference to an element is the language intended to be limited to one of the elements specified, or any other similarly limited number of elements.

Figure 2:
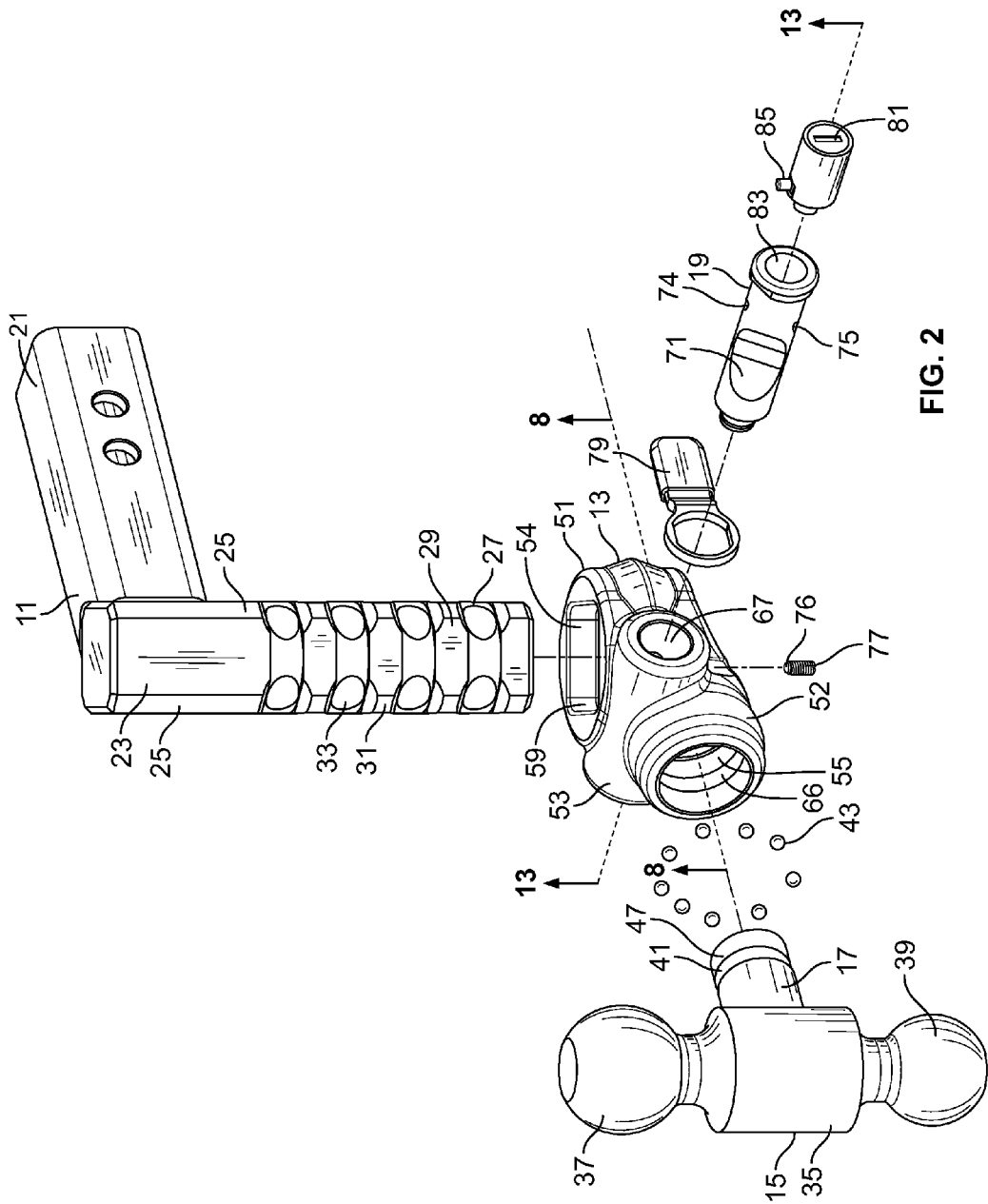
FIG. 2 is an exploded perspective view of the hitch assembly.
Figure 3:
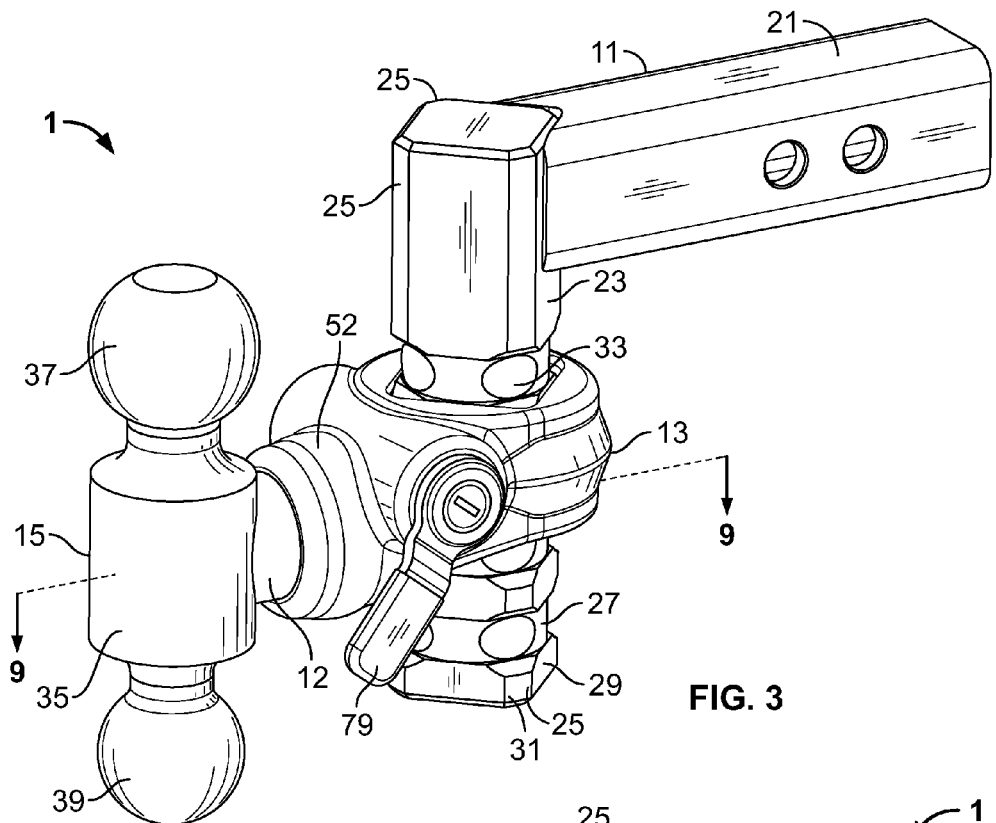
FIG. 3 is a perspective view of the hitch assembly with a hitch ball member in a tow or use position.
Figure 4:
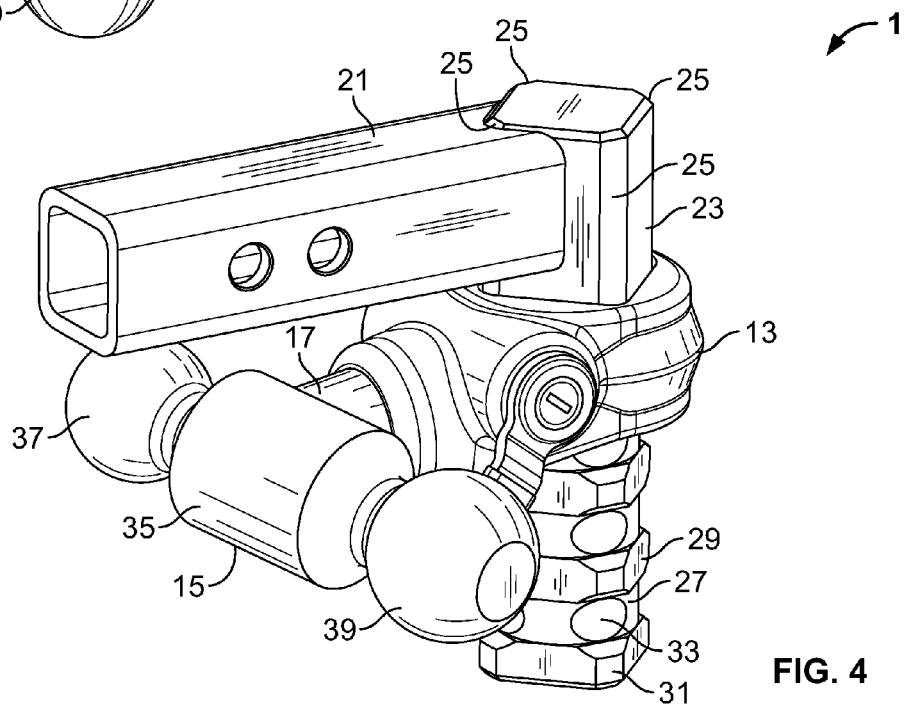
FIG. 4 is a perspective view of the hitch assembly with the hitch ball member in a stowed position.

Referring to the drawings in more detail, the reference number 1 generally designates an adjustable hitch assembly according to the present invention. Referring to FIG. 1, the assembly 1 is for use with a towing vehicle with a receiver hitch 2 having a standard square receiver 3, such as a two-inch receiver and for coupling with the coupler 5 of a trailer or the like. As best seen in FIG. 2, the hitch assembly 1 generally comprises an L-shaped hitch base 11, a mounting collar assembly 13, a hitch ball assembly 15 with a pivot shaft 17 and a rotating latch pin 19 for selectively fixing the components in a desired position or freeing them for adjustment. FIG. 3 shows the hitch ball assembly 15 secured in a tow position and FIG. 4 shows the hitch ball assembly 15 secured in a stow position.

Figure 5:
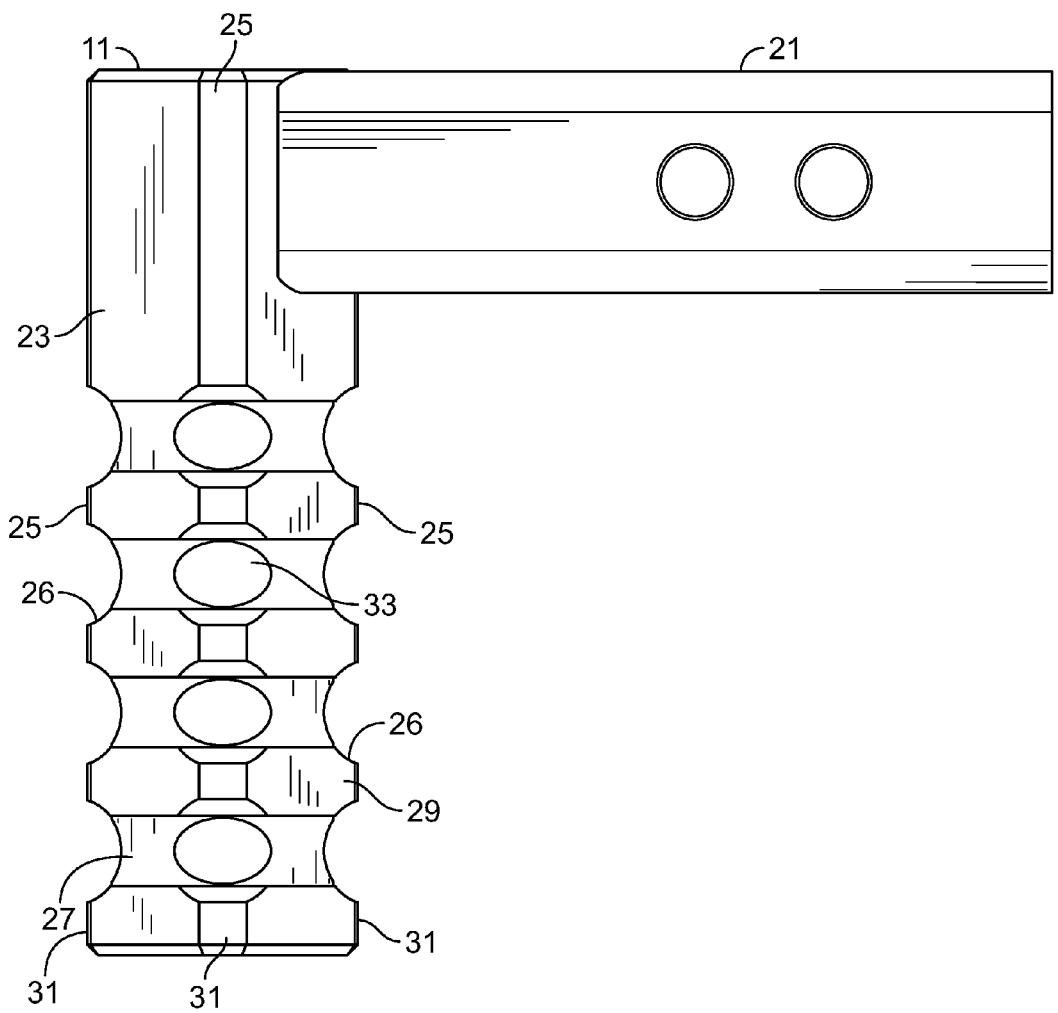
FIG. 5 is a side view of an L-shaped hitch base of the hitch assembly.

The hitch base 11, as shown in FIG. 5, includes a shaft 21 and a post 23 extending generally transverse to each other. The shaft 21 is received by and securable within a square tube receiver 3 typically found on the back of a towing vehicle and may generally be described as extending horizontally when the tow vehicle is on level ground. The post 23 extends generally vertically downward from the horizontal shaft 21. Although the post 23 is depicted herein as extending downwardly from the horizontal shaft 21, it is to be understood that the assembly 1 may be inverted such that the post 23 extends upwardly from the horizontally extending shaft 21. In addition, although the post 23 preferably extends roughly at true vertical, it is to be understood that post 23 could be angled relative to the horizontal shaft 21 preferably at an acute angle relative to true vertical.

The post 23 is formed from a square bar with beveled vertical edges 25 and a plurality of evenly spaced, circular grooves or channels 26 cut into the post 23 about its vertical axis. These grooves 26 create alternating circular cross-section segments or circular sections 27 and square cross-section segments or square sections 29. In the embodiment shown there are four circular sections 27 and five square sections 29. As used herein, the term square, used to describing the square sections 29 is intended to include structure having a generally square shape with sides of equal length with rounded or clipped corners. The term circular is intended to include structure having a generally circular cross-section. The width of the square sections 29 are at least equal to or slightly greater than the diameter of the circular sections 27 such that the corners of the square sections 27 extend past the circular sections to form corner protrusions 31. Divots or pin receiving grooves 33 are formed in each circular section 27 between the protrusions 31 of each upper and lower square section 29. It is to be understood that the post 23 or shaft 21 of the hitch base 11 could be formed from tubing shaped to incorporate the shape described above.

Figures 6, 7:
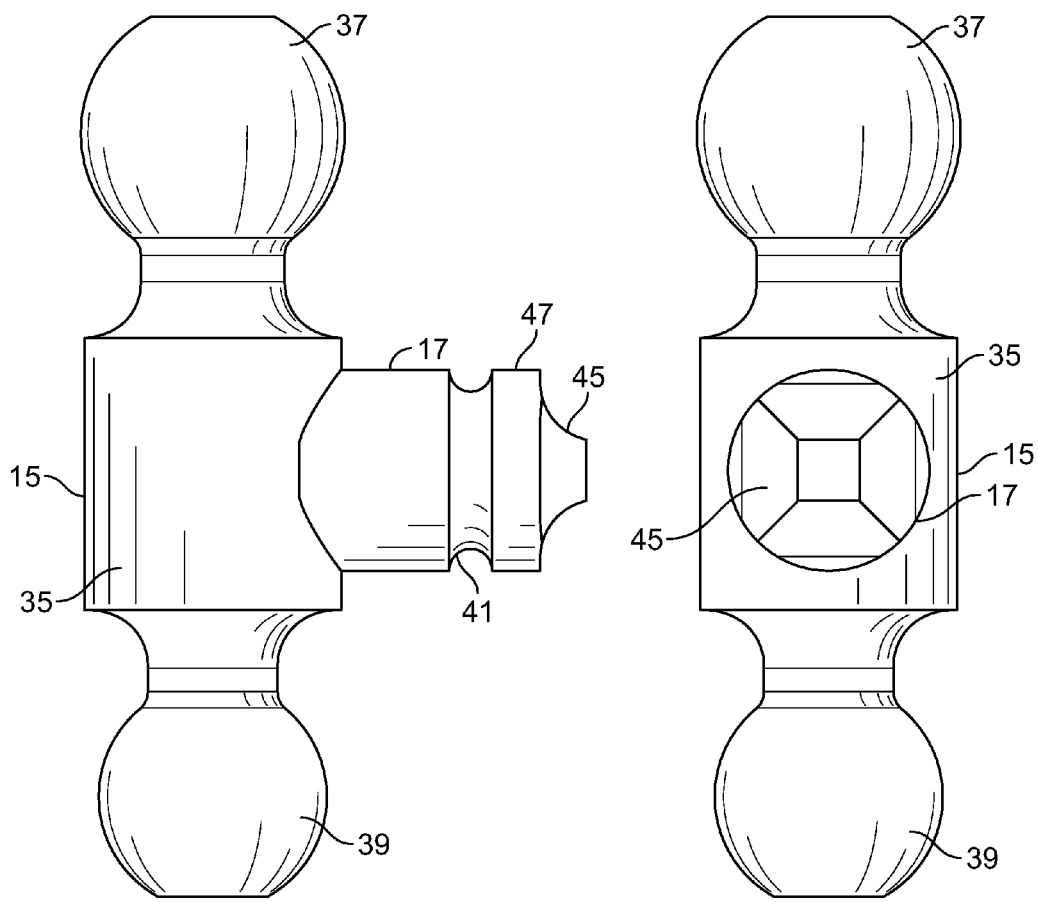
FIG. 6 is a side view of a double hitch ball member with a pivot shaft.
FIG. 7 is a rear view of the double hitch ball member and pivot shaft.
Figure 8:
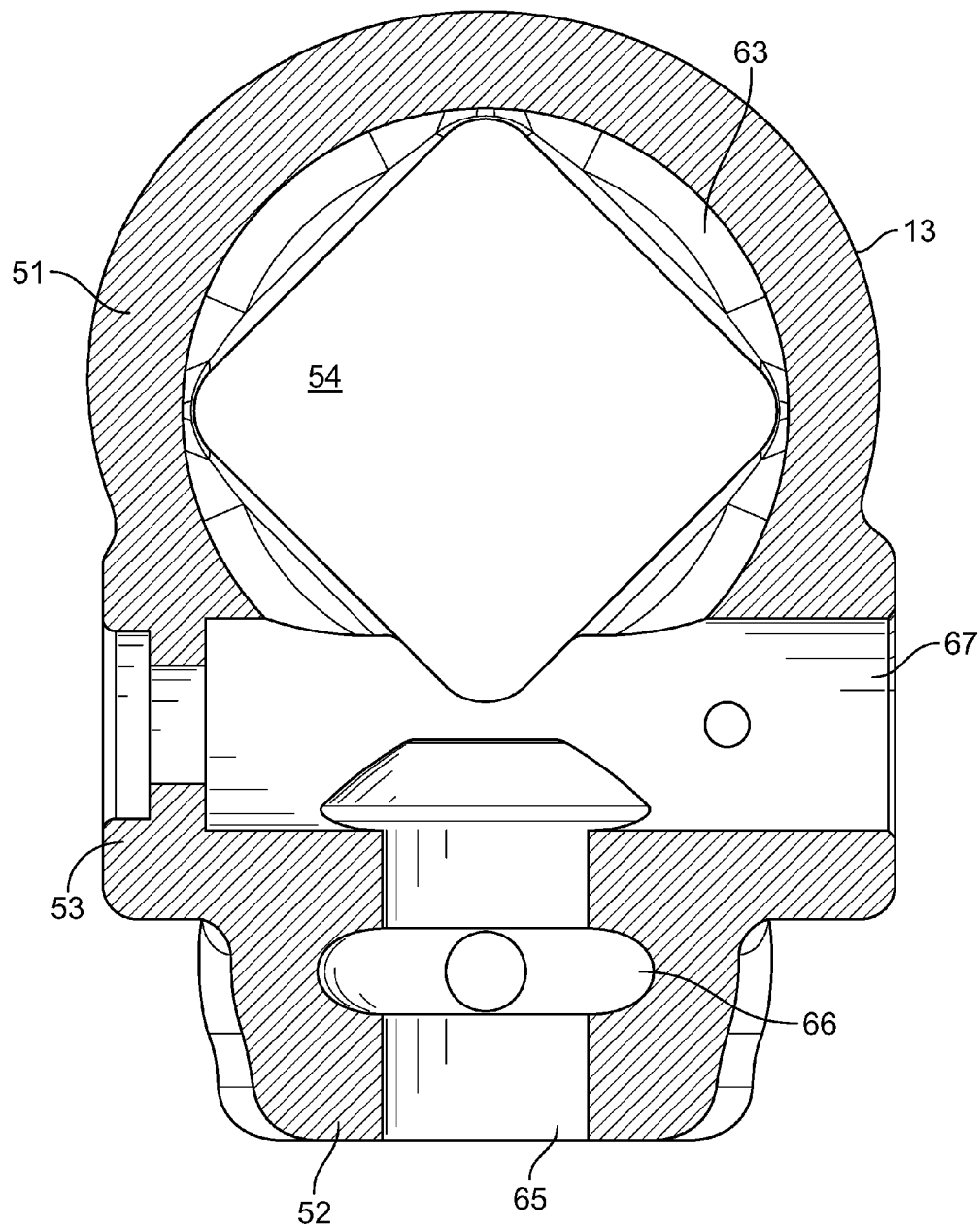
FIG. 8 is a cross-sectional view of the hitch ball mounting collar taken along line 8-8 of FIG. 2.

Referring to FIGS. 6 and 7, the hitch ball assembly 15 includes a central body or base 35 with first and second hitch balls 37 and 39 extending outward from opposed ends of the central body 35 along a hitch ball axis. The hitch balls 37 and 39 are sized for reception in two different sized hitch ball receivers or ball sockets in different trailer couplers 5 or the like. The hitch ball pivot shaft 17 extends outward from the central body 35 transverse to the hitch ball axis. A ball bearing race 41 is formed on the circumference of the pivot shaft for receiving ball bearings 43. Additionally, pin receiving grooves 45 are formed on the rearward end 47 of the pivot shaft 17 at ninety-degree incremental angles. Two of the grooves 45 extend transverse to the hitch ball axis and two extend parallel thereto. It is foreseen to one of ordinary skill in that art that the hitch ball assembly 15 may include a plurality or up to three hitch balls. It is also foreseen that the angular positions of the pin receiving grooves may vary depending on the desired angles at which the user desires to fix the orientation of the hitch balls, as described below.

The mounting collar assembly 13 as shown in FIGS. 2 and 8-11, comprises a post receiving collar 51, a pivot shaft receiving collar 52 projecting laterally from the post receiving collar 51 and a pin receiving sleeve 53 extending generally transverse and tangential to the post receiving collar 51 and the pivot shaft receiving collar 52 at the junction therebetween. A vertical post receiving bore 54 is formed in and extends vertically through the post receiving collar 51. The post receiving bore 54 forms square upper and lower internal portions or sections 59, 61 and a circular middle internal portion or section 63 in the post receiving collar 51. The upper and lower internal bore sections 59, 61 are square and are slightly greater in width than the square segments 29 of vertical post 23. The middle internal bore section 63 is circular and has a diameter that exceeds the diagonal dimension (or widest dimension) of each square bore section 59, 61. The internal bore sections 59, 61, 63 are evenly spaced and correspond to the spacing of the alternating circular segments 27 and square segments 29 of the vertical post 23 which are also evenly spaced.

A pivot shaft receiving bore 65 is formed in the pivot shaft receiving collar 52. The pivot shaft receiving bore 65 projects outward through the pivot shaft receiving collar 52 and transverse to the vertical post receiving bore 54. A ball bearing race 66 is formed in the pivot shaft receiving collar 52 around the circumference of the pivot shaft receiving bore 65. The pivot shaft receiving bore 65 is separated from the post receiving bore 54 by an adjacent portion of the post receiving collar 51.

The pivot shaft 17 of the hitch ball assembly 15 is secured in the pivot shaft receiving bore 65 and is rotatable about its longitudinal axis such that a user may rotate the pivot shaft 17 to achieve a desired orientation of the attached hitch balls 37 and 39. Ball bearings 43 are received in the ball bearing races 41, 66 of the pivot shaft 17 and the shaft receiving collar 52 to facilitate rotation of the shaft 17 within collar 52 and to secure the pivot shaft 17 within the shaft receiving collar 52.

A pin receiving bore 67 is formed in and extends horizontally through the pin receiving sleeve 53. The pin receiving bore 67 extends generally tangential to but overlapping with and opening into the middle, circular portion 63 of the vertical post receiving bore 54 and intersecting and opening into the horizontal hitch pivot shaft receiving bore 65. The pin receiving bore 67 opens into the pivot shaft receiving bore 65 offset from the center of the bore 65 and generally across an upper edge thereof.

Figure 12:
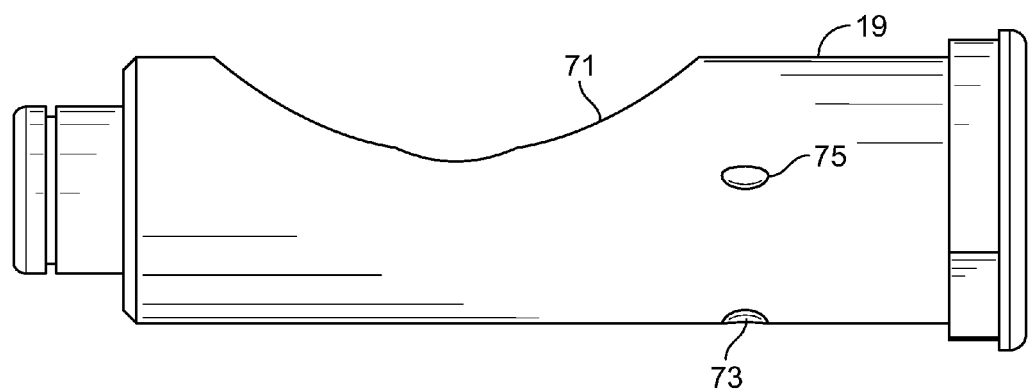
FIG. 12 is a side view of the latch pin.

The rotating latch pin 19, shown separately in FIG. 12, is generally cylindrical with a notch 71 formed on one side of the cylinder. Additionally, first, second and third position retaining indentations 73, 74 and 75 are formed on the latch pin 19 and sized to receive a ball detent 76 incorporated into a ball plunger assembly 77 received in the pivot shaft receiving collar 52. The position indicating indentations 73, 74 and 75 are spaced to align with the ball detent when the pin 19 is rotated to one of the three functional positions as discussed in more detail below. The latch pin 19 is positioned in the latch pin receiving bore 67 and rotates about its longitudinal axis within the latch pin receiving bore 67. A handle 79 may be used to rotate the latch pin 19.

Figure 9:
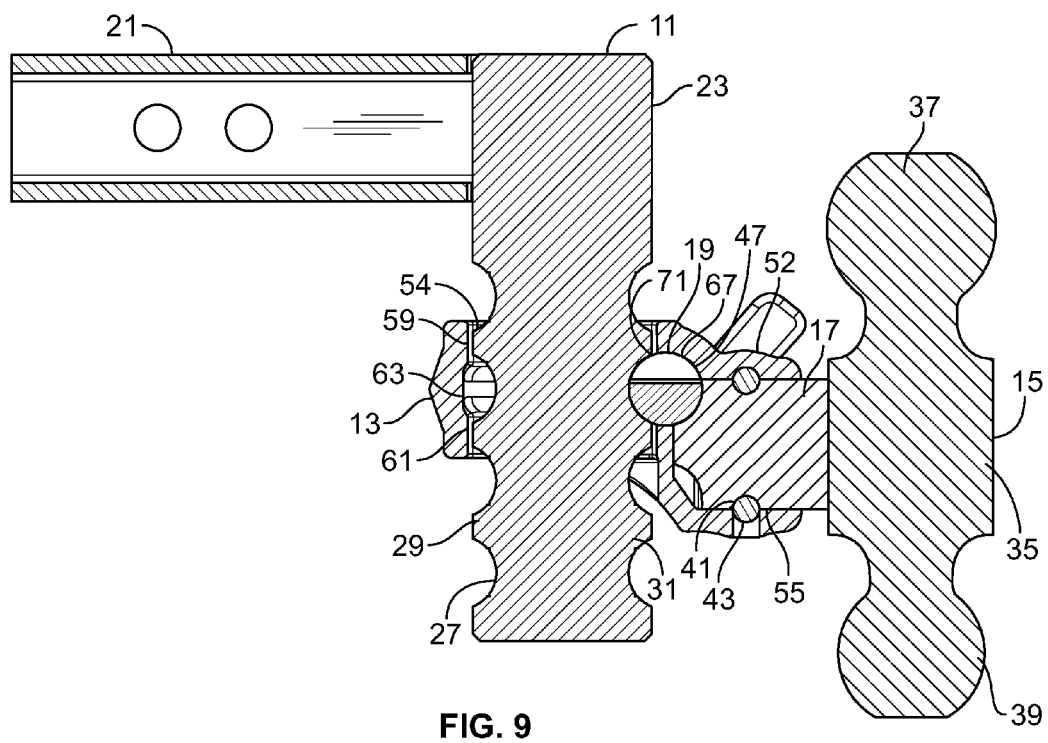
FIG. 9 is a fragmentary, cross-sectional side view of the hitch assembly taken along line 9-9 of FIG. 3 with a latch pin in a fully latched position.
Figure 10:
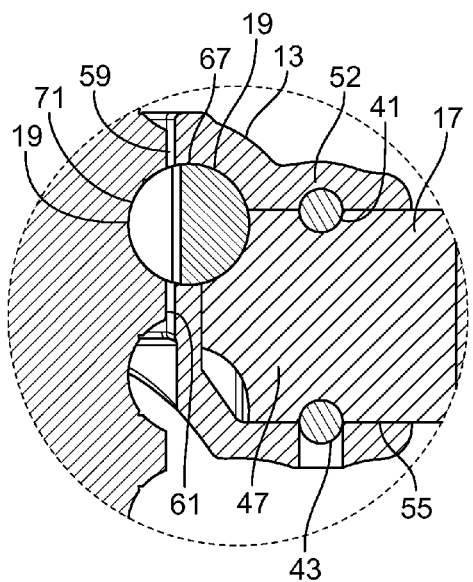
FIG. 10 is an enlarged cross-section and fragmentary view of the hitch assembly similar to FIG. 9 with the latch pin in a hitch ball member adjustment position.
Figure 11:
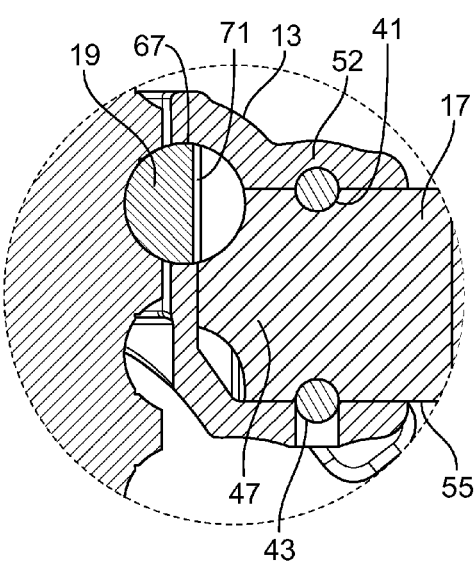
FIG. 11 is a view similar to FIG. 10 with the latch pin in a mounting collar adjustment position.

The latch pin 19 may be oriented in three general functional positions; a fully latched position; a hitch ball adjustment position and a mounting collar adjustment position. In the fully latched position, as shown in FIG. 9, the vertical and axial orientation of the mounting collar 13 is fixed relative to vertical post 23 and the orientation of the double hitch ball assembly 15 is fixed relative to the mounting collar 13. With the latch pin 19 in the hitch ball adjustment position, as shown in FIG. 10, the hitch ball assembly 15 may be rotated about its shaft 17 relative to the pivot shaft receiving collar 52 to selectively position one of the two hitch balls in a tow position or position both in a stow position. With the latch pin 19 in the mounting collar adjustment position, as shown in FIG. 11, and with the square portions 59 and 61 of the post receiving bore 54 axially oriented in vertical alignment with the square cross-section segments of the vertical post 23, the mounting collar assembly 13 and the attached hitch ball assembly 15 may be slid vertically on post 23 to adjust the height of the hitch ball assembly 15. In addition, with the pin 19 in the mounting collar adjustment position, when the mounting collar 13 is vertically positioned with the square internal bore portions 59 and 61 of post receiving collar 51 horizontally or laterally aligned with circular segments 27 of the vertical post 23, the mounting collar 13 and attached hitch ball assembly 15 may be rotated about the vertical axis of post 23 to rotate the hitch ball assembly 15 between the tow and stow positions.

When the latch pin 19 is rotated to the fully latched position, the ball detent 76 aligns with the first position indicating indentation 73 to hold the pin 19 in position until enough force is applied to the latch pin 19 through handle 79 to rotate the indentation 73 past ball detent 76. Similarly, the ball detent 76 is aligned with second position indicating indentation 74 when the pin 19 is in the hitch ball adjustment position and the ball detent 76 is aligned with the third position indicating indentation 75 when the pin 19 is in the mounting collar adjustment position. This allows a user to recognize when the latch pin 19 is rotated into each of these three functional positions.

In the fully latched position, the notch 71 of latch pin 19 extends upward and portions of the body of the pin 19 adjacent the notch 71 extend into the pin receiving groove 45 in the hitch ball assembly pivot shaft 17 and into the pin receiving grooves or dimples 33 in the circular sections 27 of the vertical post 23. The pin 19 may be positioned in the fully latched position when the mounting collar 13 is oriented such that the pin 19 extends across or is axially aligned with one of the pin receiving grooves 33 in vertical post 23. Such alignment occurs when the mounting collar 13 is positioned such that the upper and lower, internal square bore portions 59 and 61 of the post receiving collar 51 are horizontally aligned with and surround, adjacent square segments 29 of the vertical post 23 which prevents axial rotation of the mounting collar assembly 13 relative to the post 23. In the embodiment shown, the post receiving collar 51 may be secured and latched in position at one of four different levels where the square bore portions 59 and 61 align with and surround adjacent square segments 29 of the vertical post 23. At each of these levels, the mounting collar assembly 13 may be positioned and secured or latched in one of four axial orientations relative to the vertical post 23 and in each of these axial orientations, the pin 19 will be aligned with a respective pin receiving groove 33 in the vertical post 23. It is to be understood that the desired axial orientation of the mounting collar 13 relative to the vertical post 23 can only be adjusted when the post receiving collar 51 is vertically positioned on the post 23 with the square portions 59 and 61 of the post receiving bore 54 horizontally aligned with and surrounding adjacent circular segments 27 on vertical post 23. Once the desired axial orientation of the mounting collar 13 relative to the post 23 is selected, the mounting collar is slid up or down on the post 23 to slide the square bore portions 59 and 61 in the post receiving collar 51 over and in mating engagement with the square segments 29 of the post 23.

The vertical post 23 is secured to the horizontal shaft 21 such that two of the corners or post protrusions 31 of each square section 29 extend in axial alignment with the horizontal shaft 21 and the other two corners or post protrusions 31 extend in a plane transverse to axis of the horizontal shaft 21.

Based upon this orientation of the post 23 relative to the shaft 21, at each of the height adjustable levels of the mounting collar 13 relative to the vertical post 23, the hitch ball assembly 15 connected to the mounting collar 13 may be positioned in one of four axially oriented positions, a tow position extending past the hitch base shaft 21 and post 23, a stow position extending beneath the hitch base shaft 21 or to either side of the vertical post 23.

When the user desires to adjust the orientation of the hitch balls 37 and 39 or select the other hitch ball 37 or 39 for use, the latch pin 19 is rotated to the hitch ball adjustment position, as shown in FIG. 10, so that the notch 71 faces toward the hitch ball assembly 15 and the cylindrical wall of the latch pin 19 is advanced out of or disengages from the pin receiving groove 45 in which it was positioned. With the pin 19 rotated to the hitch ball adjustment position, the pivot shaft 17, and attached hitch balls 37 and 39, may be rotated to a desired orientation. For example, if the user desires to use the first hitch ball 37, the pivot shaft is rotated such that the first hitch ball 37 is in the upward orientation. If a user desires to use the second hitch ball 39, the pivot shaft 17 will be rotated such that the second hitch ball 39 is in the upward position. When the user wants to position the hitch balls in a stowed position, the hitch balls 37 and 39 are first rotated such that an axis through the hitch balls 37 and 39 generally extends horizontally. Once the hitch balls 37 and 39 are positioned in a desired alignment, the latch pin 19 is rotated back to the fully latched position so that the cylindrical wall of the pin 19 adjacent notch 71 advances back into engagement with the aligned groove 45 on the end of the hitch ball assembly pivot shaft 17 which prohibits further rotation of the pivot shaft 17. As noted earlier, a user may select a 'use' position where the first or second hitch ball 37, 39 is in the upward position, or a 'stow' position where the first and second hitch balls 37, 39 are in a sideways or leftward-rightward orientation. While it is foreseen that the number of orientations may be increased by increasing the number of pin receiving grooves 45, the number of orientations is limited to the number of pin receiving grooves 45 formed on the pivot shaft rearward end 47.

As discussed previously, vertical or axial positioning of the hitch ball assembly 15 relative to the vertical post requires first rotating the latch pin 19 to the mounting collar adjustment position. In the mounting collar adjustment position, the notch 71 faces the vertical post 23 and a portion of the body of the pin 19 adjacent the notch 71 extends into the pin receiving groove 45 on pivot shaft 17. In this position, the rotational orientation of the hitch ball assembly 15 relative to the pivot shaft receiving collar 52 and the mounting collar 13 is fixed as the height or axial orientation of the mounting collar 13 relative to the vertical post 23 is adjusted. The notch 71 is sized to allow the vertical post protrusions or beveled square corners 31 of the post 23 to slide through or past the notch 71 in the pin 19 as the post receiving collar 51 of mounting collar assembly 13 slides vertically on the post 23. With the latch pin 19 in the mounting collar adjustment position, the mounting collar assembly 13 can freely slide along the vertical post 23 and off of or onto the free end thereof. The number of levels at which the mounting collar assembly 13 may be secured may be varied by increasing or decreasing the number of alternating circular segments 27 and square segments 29 on the post which will require either lengthening the post 23 or reducing the height of each of these segments 27 and 29 and the height of the corresponding upper, lower and middle bore portions 59, 61 and 63 in the post receiving collar 51.

As noted previously, FIG. 3 shows a hitch ball assembly 15 in a tow position and FIG. 4 shows a hitch ball assembly 15 positioned in a stow position. In the tow position, one of the hitch balls extends upward and the hitch balls extend on an opposite side of the vertical post 23 from the horizontal shaft 21 of the hitch base 11 to position the hitch balls 37 and 39 past the bumper (not shown) of the tow vehicle. In the stow position, the hitch balls 37 and 39 are oriented with their hitch ball axis extending horizontally and the hitch ball assembly 15 is rotated beneath the hitch base shaft 21.

To rotate the hitch ball assembly 15 about the post 23, between the tow position and the stow position, the mounting collar assembly 13 must first be vertically adjusted to align and overlap the square portions 59 and 61 of the bore 54 in the post receiving collar 51 with the spaced apart circular segments 27 of the vertical post 23 while the latch pin 19 is in the mounting collar adjustment position. Once the mounting collar assembly 13 is rotated to the desired axial orientation relative to the post 23, the post receiving collar 51 must be slid vertically to realign the square portions 59 and 61 of the post receiving bore 54 therein with the square segments 29 on the vertical post 23. The latch pin 19 is then rotated back to the fully latched position to engage the aligned pin receiving groove 33 in the circular section 27 of the vertical post 23 while remaining engaged with the pin receiving groove 45 in the hitch ball assembly pivot shaft 17.

Figure 13:
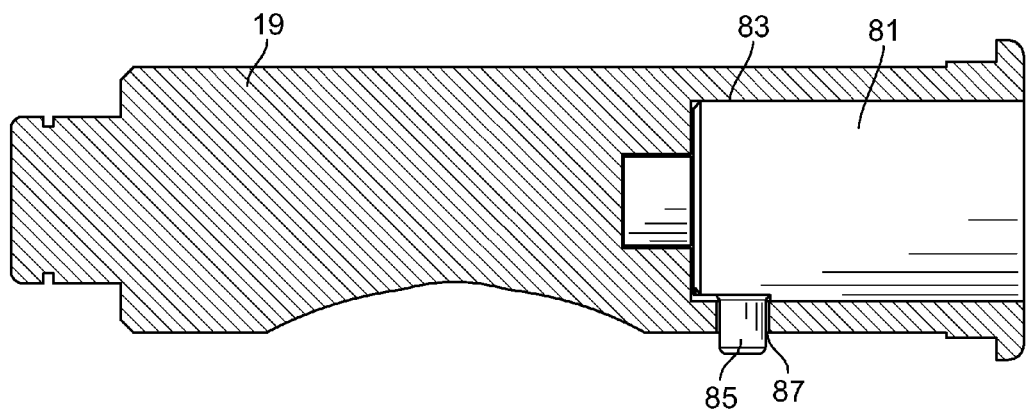
FIG. 13 is an enlarged and fragmentary cross-sectional view of a lock assembly taken along line 13-13 of FIG. 2.

A lock 81 is preferably incorporated into the latch pin 19 to lock the latch pin 19 in the fully latched position to prevent unsafe operating conditions or theft of the hitch ball assembly 15. As shown in FIGS. 2 and 13, the lock 81 is positioned in a lock receptacle 83 formed in the outer end of the latch pin 19. A lock plunger 85 extends through a lock plunger hole 87 formed in the latch pin 19 in communication with lock receptacle 83. A plunger receiving bore (not shown) is formed in the inner surface of the latch pin receiving sleeve 53 and positioned to align with the lock plunger 85 when the latch pin 19 is rotated to the fully latched position. The lock plunger 85 may be advanced into and out of the plunger receiving bore (not shown) to selectively lock and unlock the latch pin 19 in the fully latched position using a key (not shown).

It is to be understood that while certain forms of the present invention have been illustrated and described herein, it is not to be limited to the specific forms or arrangement of parts described and shown. For example, it is to be understood that the hitch could be configured such that the orientation of the mounting collar relative to the square cross-section segments of the post could be used to limit vertical movement of the mounting collar and hitch balls relative to the post and the pin could be used to prevent axial rotation of the mounting collar and hitch balls relative to the post.

I claim:

1. A hitch assembly comprising:
a hitch base including a post;
a mounting collar slidable on and rotatable about said post;
a hitch ball member having at least one hitch ball extending from a hitch ball base along a hitch ball axis; said hitch ball member rotatably secured to said mounting collar such that said hitch ball is rotatable into and out of an upwardly extending alignment relative to said hitch base; and
a latch pin rotatably received in said mounting collar; said latch pin rotatable between a latched position, a hitch ball member adjustment position and a mounting collar adjustment position; wherein
in said latched position, a portion of said latch pin is positioned to prevent rotation of said hitch ball member relative to said mounting collar and a portion of said latch pin is positioned to prevent sliding or axial rotation of said mounting collar relative to said post;

in said hitch ball member adjustment position no portion of said latch pin is positioned to prevent rotation of said hitch ball member relative to said mounting collar; and in said mounting collar adjustment position no portion of said latch pin is positioned to prevent sliding or axial rotation of said mounting collar relative to said post and said mounting collar is rotatable about said post to rotate said hitch ball member between a use position and a stow position on opposite sides of said post.

2. The hitch assembly as in claim 1, wherein when said latch pin is in said hitch ball member adjustment position, a portion of said latch pin is positioned to prevent sliding or axial rotation of said mounting collar relative to said post.

3. A hitch assembly comprising:

a hitch base having a shaft sized for reception in a hitch receiver on a tow vehicle and a post extending generally transverse from said shaft so as to extend generally vertically when said tow vehicle is on level ground;

a mounting collar having a post receiving bore extending therethrough; said hitch base post extending through said post receiving bore such that said mounting collar is slidable on and rotatable about said post;

a hitch ball member having a pair of hitch balls projecting in opposite directions from a hitch ball base along a hitch ball axis and a hitch ball member shaft projecting transverse to said hitch ball axis; said hitch ball member shaft rotatably secured to said mounting collar about an axis extending transverse to an axis extending through said post receiving bore;

a latch pin rotatably connected to said mounting collar;

said latch pin rotatable between a latched position, a hitch ball member adjustment position and a mounting collar adjustment position; in said latched position, a portion of said latch pin is positioned to prevent rotation of said hitch ball member shaft relative to said mounting collar and a portion of said latch pin is positioned to prevent vertical sliding of said mounting collar relative to said post; in said hitch ball member adjustment position no portion of said latch pin is positioned to prevent rotation of said hitch ball member shaft relative to said mounting collar; and in said mounting collar adjustment position no portion of said latch pin is positioned to prevent vertical sliding of said mounting collar relative to said post.

4. The hitch assembly as in claim 3, said post having alternating segments of square cross-section and circular cross-section including at least three square cross-section segments and at least two circular cross-section segments; said square cross-section segments having a width at least equal to a diameter of said circular cross-section segments such that corners of said square cross-section segments project outward relative to said circular cross-section segments; at least two latch pin receiving grooves formed in each of said circular cross-section segments on opposite sides thereof for receiving a portion of said latch pin in said latched position.

5. The hitch assembly as in claim 4 wherein said at least two latch pin receiving grooves are two of four latch pin receiving grooves formed in each of said circular cross-section segments adjacent corners of said adjacent alternating square cross-section segments.

6. The hitch assembly as in claim 3 wherein said post extends downward from said hitch base shaft.

7. The hitch assembly as in claim 3 wherein said hitch ball member shaft includes a shaft end received within said mounting collar; said hitch ball member shaft end having at least two shaft securement grooves formed therein, wherein a selected one of said shaft securement grooves is engaged by said latch pin in said latched position for securing said hitch ball member in a selected orientation relative to said mounting collar.

8. A hitch assembly comprising:

a hitch base having a shaft sized for reception in a hitch receiver on a tow vehicle and a post extending generally transverse to said horizontal shaft so as to extend generally vertically when said hitch base shaft is received in said hitch receiver of said vehicle and said vehicle is generally level; said post having alternating segments of square cross-section and circular cross-section including at least three square cross-section segments and at least two circular cross-section segments; said square cross-section segments having a width at least equal to a diameter of said circular cross-section segments such that corners of said square cross-section segments project outward relative to said circular cross-section segments; at least two latch pin receiving grooves formed in each of said circular cross-section segments on opposite sides thereof;

a mounting collar; said mounting collar having a post receiving bore extending therethrough, said post receiving bore having a circular bore section between square bore sections, said circular bore section having a diameter at least as long as a diagonal of said square bore sections; said square bore sections being slightly larger than said square cross-section segments of said post; said mounting collar slidable on said post when said square bore sections are axially oriented in alignment with said square cross-section segments of said post; said mounting collar is rotatable about said post when said square bore sections are laterally aligned with circular cross-section segments of said post;

a hitch ball member having at least one hitch ball extending from a hitch ball base along a hitch ball axis and a shaft projecting from said hitch ball base transverse to said hitch ball axis; said shaft is rotatably secured to said mounting collar such that said hitch ball is rotatable into and out of an upwardly extending alignment relative to said hitch base a cylindrical latch pin having a cylindrical surface and a notch formed thereon, said latch pin rotatably received in said mounting collar;

said latch pin rotatable between a latched position, a hitch ball member adjustment position and a mounting collar adjustment position; said latch pin is advanceable to said latched position when said circular bore section of said mounting collar is aligned with one of said circular cross-section segments of said post and said latch pin is aligned with one of said pin receiving grooves in said circular bore section; when advanced to said latched position, a portion of said latch pin is positioned to prevent rotation of said hitch ball member shaft relative to said mounting collar and a portion of said latch pin extends into said pin receiving groove of said circular cross-section segment to prevent vertical sliding of said mounting collar relative to said post; when said latch pin is rotated to said hitch ball member adjustment position, said notch in said latch pin faces said hitch ball member shaft such that said latch pin does not prevent rotation of said hitch ball member shaft relative to said mounting collar; and when said latch pin is rotated to said mounting collar adjustment position said notch in said latch pin faces said post such that said latch pin does not prevent sliding or axial rotation of said mounting collar relative to said post.

9. The hitch assembly as in claim 8 wherein said hitch base includes a hitch base shaft sized for reception in a hitch receiver on a tow vehicle; said post extending generally transverse to said hitch base shaft.

10. The hitch assembly as in claim 9 wherein said post depends from said hitch base shaft.

11. The hitch assembly as in claim 9 wherein said at least two latch pin receiving grooves are two of four latch pin receiving grooves formed in each of said circular cross-section segments adjacent corners of said adjacent alternating square cross-section segments.

12. The hitch assembly as in claim 9 wherein said hitch ball member shaft includes a shaft end received within said mounting collar; said hitch ball member shaft end having at least two shaft securement grooves formed therein, wherein a selected one of said shaft securement grooves is engaged by said latch pin in said latched position for securing said hitch ball member in a selected orientation relative to said mounting collar.

13. The hitch assembly as in claim 9 wherein said hitch ball member shaft includes a shaft end received within said mounting collar; said hitch ball member shaft end having at least four shaft securement grooves formed therein, wherein a selected one of said shaft securement grooves is engaged by said latch pin in said latched position for securing said hitch ball member with either of said hitch balls directed upwards or both of said hitch ball members extending horizontally.

14. A hitch assembly comprising:
a hitch base including a post having alternating segments of square cross-section and circular cross-section; said square cross-section segments having a width at least equal to a diameter of said circular cross-section segments such that corners of said square cross-section segments project outward relative to said circular cross-section segments;
a mounting collar; said mounting collar having a post receiving bore extending therethrough, said post receiving bore having a circular bore section adjacent to a square bore section, said circular bore section having a diameter at least longer than a diagonal of said square cross-section segments of said post; said square bore sections being slightly larger than said square cross-section segments of said post; said mounting collar slidable on said post but not rotatable about said post when said square bore section is axially oriented in alignment with one of said square cross-section segments of said post; said mounting collar rotatable about said post when said square bore section is aligned with one of said circular cross-section segments of said post;
a hitch ball member secured to said mounting collar having at least one hitch ball extending outwardly therefrom along a hitch ball axis; and
retaining means for selectively retaining said mounting collar with said square bore section in axial alignment with a respective one of said square cross-section segments of said post such that said mounting collar cannot be slid axially along said post to bring said square bore section into alignment with one of said circular cross-section segments of said post.

15. The hitch assembly as in claim 14 wherein:
said retaining means comprises a cylindrical latch pin having a cylindrical surface and a notch formed thereon, said latch pin rotatably received in said mounting collar;
each of said circular cross-section segments on said post has at least one latch pin receiving groove formed therein;
said latch pin is rotatable between a latched position and a mounting collar adjustment position; said latch pin advanceable to said latched position when said circular bore section of said mounting collar is aligned with one of said circular cross-section segments of said post and said latch pin is aligned with said pin receiving grooves in said circular bore section;
when advanced to said latched position, a portion of said latch pin extends into said pin receiving groove of said circular cross-section segment to prevent vertical sliding of said mounting collar relative to said post; and when said latch pin is rotated to said mounting collar adjustment position said notch in said latch pin faces said post such that said latch pin does not prevent sliding or axial rotation of said mounting collar relative to said post.

16. The hitch assembly as in claim 15 wherein there are at least two of said latch pin receiving grooves formed in each of said circular cross-section segments of said post on opposite sides thereof and said latch pin is advanceable to said latched position when said latch pin is aligned with any one of said at least two pin receiving grooves in said circular bore section, alignment of said latch pin with one of said pin receiving grooves orienting said hitch ball member in a use position and alignment of said latch member with another of said pin receiving grooves orienting said hitch ball member in a stow position.

17. The hitch assembly as in claim 16 wherein said at least two latch pin receiving grooves are two of four latch pin receiving grooves formed in each of said circular cross-section segments adjacent corners of said adjacent alternating square cross-section segments.

18. The hitch assembly as in claim 14 wherein said hitch ball member includes a hitch base rotatably connected to said mounting collar such that said at least one hitch ball is rotatable into and out of an upwardly extending alignment relative to said hitch base and said retaining means further selectively prevents rotation of said hitch ball base relative to said mounting collar.

19. The hitch assembly of claim 18 wherein said retaining means comprises a latch pin movably received in said mounting collar; said latch pin moveable between a latched position, a hitch ball member adjustment position and a mounting collar adjustment position; wherein:
in said latched position, a portion of said latch pin is positioned to prevent rotation of said hitch ball member relative to said mounting collar and a portion of said latch pin is positioned to prevent sliding of said mounting collar relative to said post;
in said hitch ball member adjustment position no portion of said latch pin is positioned to prevent rotation of said hitch ball member relative to said mounting collar; and
in said mounting collar adjustment position no portion of said latch pin is positioned to prevent sliding of said mounting collar relative to said post such that said mounting collar is axially slidable into a position wherein said square bore section is aligned with one of said circular cross-section segments of said post allowing said mounting collar to rotate about said post.

20. The hitch assembly as in claim 19 wherein, in said latched position, a portion of said latch pin is positioned to prevent axial rotation of said mounting collar about said post and in said mounting collar adjustment position no portion of said latch pin is positioned to prevent axial rotation of said mounting collar about said post.

21. The hitch assembly as in claim 14 wherein said circular bore section of said post receiving bore in said mounting collar lies between said adjacent square bore section and a second square bore section.

22. The hitch assembly as in claim 17 wherein said post has at least three of said square cross-section segments and at least two of said circular cross-section segments.

23. A hitch assembly comprising:
a hitch base including a post;
a mounting collar slidable on said post;
a hitch ball member having at least one hitch ball extending from a hitch ball base along a hitch ball axis; said hitch ball member rotatably secured to said mounting collar such that said hitch ball is rotatable into and out of an upwardly extending alignment relative to said hitch base; and
a latch pin movably received in said mounting collar; said latch pin moveable between a latched position, a hitch ball member adjustment position and a mounting collar adjustment position; wherein
in said latched position, a portion of said latch pin is positioned to prevent rotation of said hitch ball member relative to said mounting collar and a portion of said latch pin is positioned to prevent sliding of said mounting collar relative to said post;
in said hitch ball member adjustment position no portion of said latch pin is positioned to prevent rotation of said hitch ball member relative to said mounting collar; and
in said mounting collar adjustment position no portion of said latch pin is positioned to prevent sliding of said mounting collar relative to said post.

24. The hitch assembly as in claim 23 wherein said mounting collar is selectively rotatable about said post.

25. The hitch assembly as in claim 24 wherein said mounting collar is prevented from rotating about said post when said latch pin is in said latched position and is selectively rotatable about said post when said latch pin is in said mounting collar adjustment position.

26. The hitch assembly as in claim 25 wherein a portion of said latch pin is positioned to prevent said mounting collar from rotating about said post when said latch pin is in said latched position.

27. The hitch assembly as in claim 23 wherein said hitch ball member includes a shaft projecting from said hitch ball base transverse to said hitch ball axis and said shaft is rotatably secured to said mounting collar.

28. The hitch assembly as in claim 27 wherein:
in said latched position a portion of said latch pin engages said shaft to prevent rotation of said hitch ball member relative to said mounting collar and a portion of said latch pin engages said post to prevent sliding of said mounting collar relative to said post;
in said hitch ball member adjustment position no portion of said latch pin engages said shaft to prevent rotation of said hitch ball member relative to said mounting collar; and
in said mounting collar adjustment position no portion of said latch pin engages said post to prevent sliding of said mounting collar relative to said post.

29. The hitch assembly as in claim 28 wherein said mounting collar is selectively rotatable about said post.

30. The hitch assembly as in claim 29 wherein said mounting collar is prevented from rotating about said post when said latch pin is in said latched position and is selectively rotatable about said post when said latch pin is in said mounting collar adjustment position.

31. The hitch assembly as in claim 30 wherein when said latch pin is in said latched position, a portion of said latch pin engages said post to prevent rotation of said mounting collar about said post.

* * * * *